United States Patent [19]
Muntean et al.

[11] Patent Number: 6,132,216
[45] Date of Patent: Oct. 17, 2000

[54] CHILDS COUNTING BOOK

[75] Inventors: Michaela Muntean, Shelter Island; Paul Gamarello, New York City, both of N.Y.

[73] Assignee: Workman Publishing Co. Inc., New York City, N.Y.

[21] Appl. No.: 09/443,909

[22] Filed: Nov. 19, 1999

[51] Int. Cl.[7] .................................................. G09B 19/02
[52] U.S. Cl. .......................... 434/191; 434/188; 434/247; 434/258; 281/42; 446/151
[58] Field of Search .................... 434/188, 201, 434/258, 207, 209, 210, 159, 160, 167, 169, 171, 175, 176, 177, 247, 191; 446/147, 148, 149, 151; 281/42, 44, 29, 31, 38; 283/44, 61, 62, 64; 273/157 R, 159

[56] References Cited

U.S. PATENT DOCUMENTS

| | | |
|---|---|---|
| 2,060,624 | 11/1936 | Kenedy . |
| 2,304,893 | 12/1942 | Dickson ..................................... 35/31 |
| 2,394,372 | 2/1946 | Evans . |
| 2,862,309 | 12/1958 | Hellen . |
| 3,143,998 | 8/1964 | Madden . |
| 3,714,721 | 2/1973 | Tilley ........................................ 35/9 R |
| 3,715,816 | 2/1973 | White ........................................ 35/73 |
| 4,382,794 | 5/1983 | Preus ....................................... 434/193 |
| 5,022,342 | 6/1991 | Davis ...................................... 116/236 |
| 5,408,950 | 4/1995 | Porto ...................................... 116/239 |
| 5,980,354 | 11/1999 | Prest ....................................... 446/227 |

*Primary Examiner*—Sar Ruirell
*Assistant Examiner*—Bena B. Miller
*Attorney, Agent, or Firm*—Robert W. J. Usher

[57] ABSTRACT

The invention provides a child's counting or activity book having successive leaves formed with ascending numbers of sockets for mounting corresponding numbers of individual button-like, counters of a set. Each counter is anchored to a spine region by a ribbon permitting movement of the counter between any sockets. The counters are selected by the child according to instructions provided on a facing page by words, arabic numbers and illustrations of the corresponding counters. All counters of the set are initially mounted in through-sockets in the cover for storage and display.

10 Claims, 4 Drawing Sheets

CHILDS COUNTING BOOK

FIELD OF THE INVENTION

The invention relates to a child's activity book, particularly a counting book.

BACKGROUND OF THE INVENTION

The desirability of combining physical activity and physical objects or counters as aids in teaching very young children to count have been well recognized for many years.

One approach, taught by U.S. Pat. No. 2,304,893 issued 1940 to Dickson provides a number peg board having successive adjacent regions marked, respectively, with ascending numbers in arabic and text and formed with corresponding numbers of sockets for receiving matching numbers of loose-piece, color-coded, pegs selected from a set and inserted therein by a child.

However, loose-piece pegs are easily lost and may be dislodged from the board, particularly with careless handling of the board, and can be swallowed by a child user or domestic pets. An increase in the size of the pegs to obviate swallowing by a child would result in a relative massive, heavy and cumbersome structure.

U.S. Pat. No. 3,714,721 issued 1971 to Tilley teaches a book comprising a board having a slideway removably receiving alternative work sheets marked with different math problems exposed to view through openings in the board. Seats are cut out adjacent the openings for receiving respective individual, correspondingly shaped, inserts marked on their fronts with solutions to the problems and color coded on rears viewable through the back of the board. A front cover is provided to ensure that the inserts remain in their seats during inspection of the back to check the color codes.

U.S. Pat. No. 3,715,816 issued 1973 to White shows a book with pictures of different animals on each leaf. Pieces simulating respective animals food can be releasably mounted on each leaf in a storage position or at a position adjacent the animal's mouth.

All the above proposals incur the disadvantages of a child handling small, loose-piece items with risk of loss or swallowing by the child or household pets.

SUMMARY OF THE INVENTION

It is one object of the invention to provide a childs counting book having a set of counters, which enables the child to manipulate the counters according to instructions written on the book in the performance of counting routines, without risk of the counters being lost or swallowed.

It is another object of the invention to provide a child's counting book in which all the counters of the set are exposed to view by releasably mounting on a front cover thereof, from which selected individual counters can be removed by the child for mounting at appropriate locations on another leaf of the book.

According to one aspect, the invention provides a child's counting book comprising a series of leaves and a set of individual, preferably button-like, counters, different leaves of the series of leaves being provided with predetermined different numbers of manually releasable means for mounting, at predetermined mounting locations on leaves of the series of leaves, matching numbers of individual counters of the set of counters selected by the child according to instructions provided by indicia marked on at least one leaf, the individual counters being anchored to a predetermined region of the book by respective flexible ties which permit movement of counters individually between different mounting locations during counting.

The provision of the flexible ties obviates risk of loss or swallowing by a child or pet and maintains the counters in a manageable state while permitting movement between and attachment to the various leaves during counting. The mounting means may comprise individual counter-receiving sockets die-cut in the leaves, receiving the counters as individual press fits, possibly with a snap action and, preferably, all counters of the set are initially mounted in through sockets in the cover for storage and display. This also facilitates reliable retention by a shrink wrap technique, desirable for economical and effective packaging and display. The counters may have substantially the same thickness as the cover leaf lying substantially flush with the sides thereof advantagously avoiding a significant increase in thickness of the book.

The ribbons are attached to the spine region so that they can conveniently be extended to any the sockets on any page.

Alternatively, the invention may provide a puzzle or word forming book and, according to another aspect, the invention provides a child's activity book comprising first and second leaves hingedly connected together along a spine, a set of pieces having at least one of a same and different physical characteristic, each leaf having releasable means for mounting at least one selected individual piece of the set on at least one mounting position on the leaf according to instructions provided by indicia marked on at least one leaf, the pieces of the set being individually anchored to the book by respective ties which permit movement of selected pieces between mounting positions on respective first and second leaves.

It will be appreciated that if the book is made of plastic material, the sockets need not be die-cut but may be formed by a conventional molding process.

BRIEF DESCRIPTION OF THE DRAWINGS

A specific embodiment of a book according to the invention will now be described by way of example only with reference to the accompanying drawings in which.

DESCRIPTION OF PARTICULAR EMBODIMENTS

Figure 1:
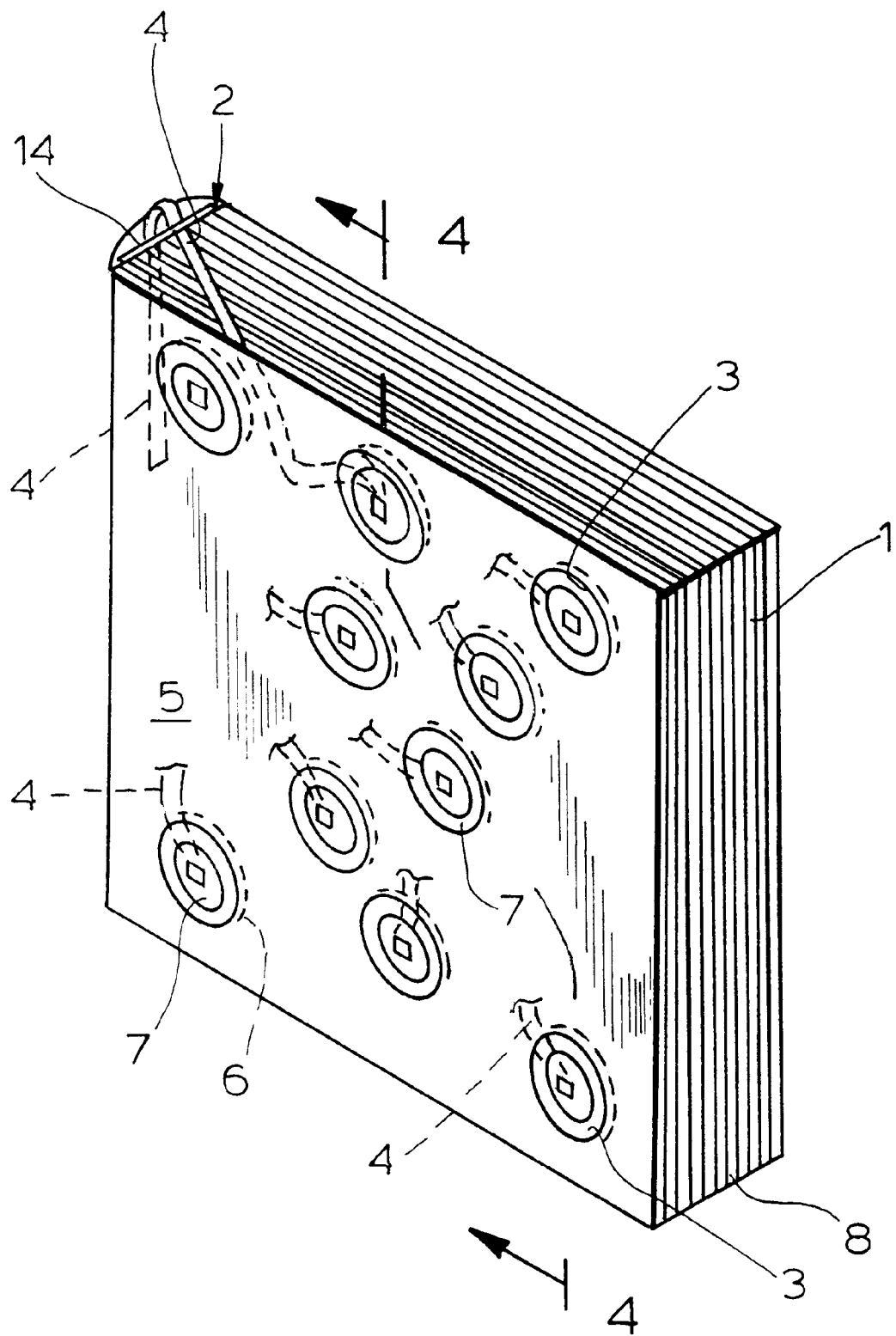
FIG. 1 is a schematic perspective view of the front of the closed book.

The child's counting book comprising a series of leaves 1, twelve in number, hingedly connected together along a spine region 2 and a set of differently colored, button-like counters 3 which are individually anchored to the spine region 2 by respective, correspondingly colored, ribbons 4.

The first leaf 5 constitutes the front cover and has a series of through-sockets 6 die cut therein into which respective individual counters 3 can be press fitted so that front faces 7 thereof are displayed on the front cover when the book is closed with their individual ribbons 4 trapped between the front cover and the next adjacent leaf 8 which is imperforate. Respective first sides 9 of the remaining successive ten leaves have blind sockets 10 die-cut therein, from one to ten in number, respectively. Facing (second) sides 11 of respective adjacent preceding leaves are marked with indicia 12 indicating the corresponding number of sockets in words, arabic numerals and colored illustrations of the counters that are to be placed in the sockets, thereby, in effect, providing instructions. The sockets 10 may be located adjacent, or form part of, an illustration on the leaf and an amusing story line or theme associated with the illustration marked on the facing sheet. Colored illustrations (not shown) of the counters are also marked on the first side of the second leaf in alignment with corresponding through-sockets 6 on the cover leaf so that counters corresponding in color can be mounted in the aligned sockets.

Figure 4:
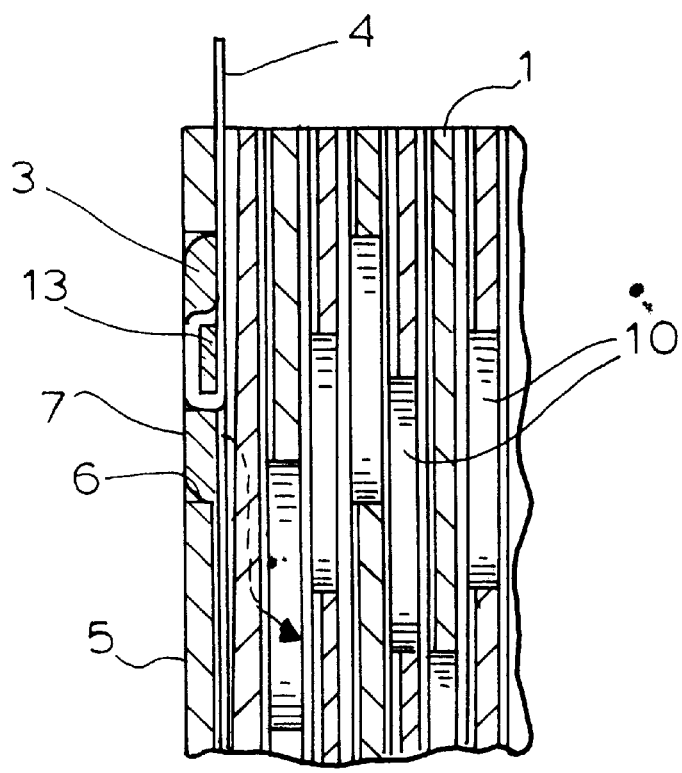
FIG. 4 is a schematic, fragmentary, cross-sectional view of the closed book taken along line 4—4 of FIG. 1; and, FIG. 5 is a schematic, fragmentary, cross-sectional view of a counter mounted in a blind-socket in a leaf.
Figure 5:
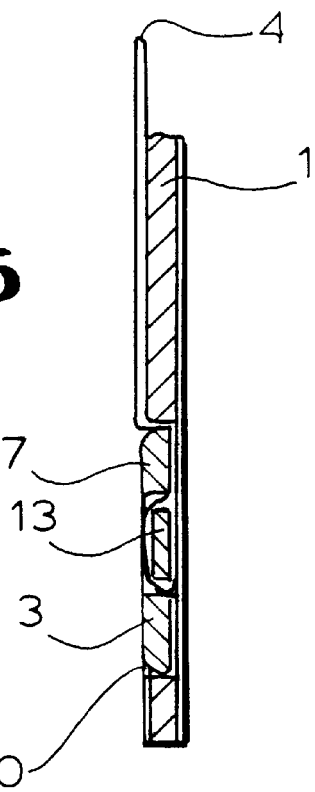

The counters 3 are each 1.25 inch diameter and formed from hard setting, plastic material, by injection molding, with a central bar 13 (FIG. 4) around which one end of a ribbon 4 is looped and secured by sewing. The counters 3 are of substantially the same thickness as an individual leaf and are formed with substantially straight peripheral edges chamfered or radiused at a front.

The leaves 1 all have the same thickness and are of laminated construction with three or more layers to provide a rigid construction, the outer layers being glossy printed surfaces providing a skin which may be relatively stiffer than a central cardboard layer, enabling the individual counters to be pressed into the sockets with a slight snap action.

The outer layers on facing sides of a pair of adjacent leaves continue as a single sheet through the spine region, hinging adjacent leaves together. A fabric anchoring strip 14, to which the free ends of the ribbons 4 are secured, bridges the spine region between the binding and the outer web hinge of the cover having opposite ends adhered between innner and outer layers of adjacent portions of front and rear outer leaves.

The positioning of the individual blind-sockets 10 on a leaf is arbitrary, relating to the theme or illustration adopted on that leaf but, for robustness, it may be best that sockets on adjacent leaves do not overlie each other in precise alignment so that support is provided for a rear wall of a socket by engagement with the surface of the underlying leaf in case a counter is inserted with excessive force.

Figure 2:
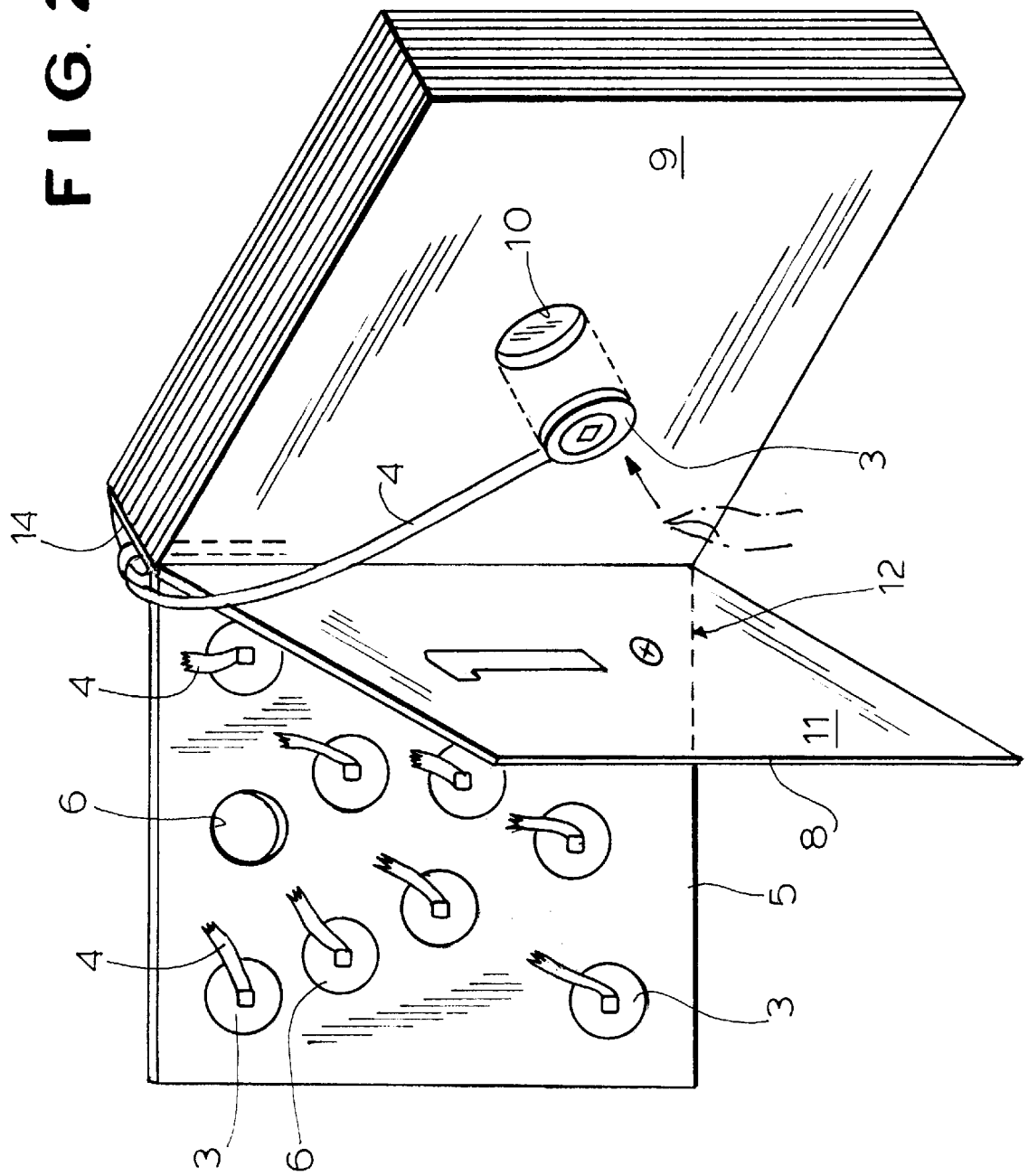
FIG. 2 is a perspective view of the book opened at the first pages during performance of a first counting step.
Figure 3:
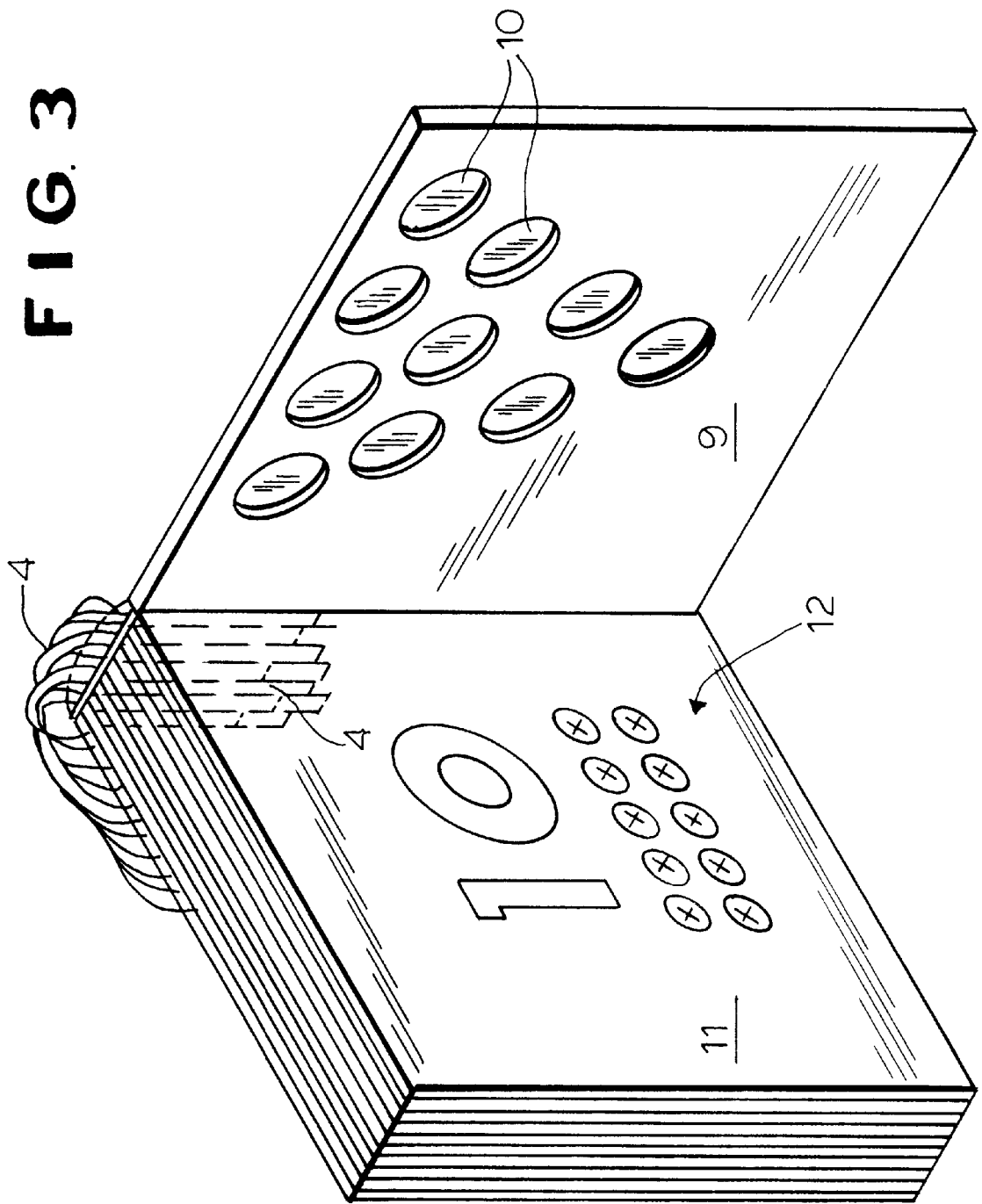
FIG. 3 is a perspective view of the book opened at the last page.

In use, as shown for example in FIG. 2, a child opens the book to the first socket bearing leaf and, following the instructions on the facing page, selects and removes a correspondingly colored counter 3 from the through-socket 6 on the cover leaf 5 and pushes it into the blind-socket where it is held as a press fit. Whilst this can be achieved while the book is upright as shown, it will be appreciated that, probably more often in practice the book will be lying flat on a floor or table providing support resisting the insertion force of the counter 3. If desired, the book may be closed with the selected button so mounted.

To progress to the next counting step, the child removes the counter from the blind-socket by tugging on the ribbon, preferably reseats it in the original socket in the front cover and turns overleaf to the next page formed with two blind-sockets. These steps are repeated for successive leaves providing valuable practice for the child not only in counting from one to ten but also in manual dexterity by manipulation of the counters without risk of loss.

We claim:

1. A child's counting book comprising a series of leaves and a set of individual counters, different leaves of the series of leaves being provided with predetermined different numbers of manually releasable means for mounting at predetermined mounting locations on leaves of the series of leaves, matching numbers of individual counters of the set of counters selected by the child according to instructions provided by indicia marked on at least one leaf, the individual counters being anchored to a predetermined region of the book by respective flexible ties which permit movement of counters individually between different mounting locations during counting.

2. A child's counting book according to claim 1 wherein the manually releasable mounting means comprise individual counter-receiving sockets die-cut in the leaves.

3. A child's counting book according to claim 1 wherein the manually releasable mounting means mount all counters of the set of counters on a single leaf in initial locations from which selected individual counters can be released and mounted at other mounting locations on another leaf during counting.

4. A child's counting book according to claim 3 wherein said single leaf forms a cover of the book and the releasable mounting means comprise individual through-sockets die-cut through the cover so that all individual counters of the set of counters are exposed as an array on the front cover by receipt as press fits from an inside face thereof in respective though-sockets.

5. A child's counting book according to claim 4 wherein a next leaf underlying the cover is imperforate.

6. A child's counting book according to claim 3 wherein the book has a spine region to which the individual counters are anchored by the respective flexible ties.

7. A child's counting book according to claim 2 wherein the counter-receiving sockets are blind sockets.

8. A child's activity book comprising first and second leaves hingedly connected together along a spine, a set of pieces having at least one of a same and different physical characteristic, each leaf having releasable means for mounting at least one selected individual piece of the set on at least one mounting position thereon according to instructions provided by indicia marked on at least one leaf, the pieces of the set being individually anchored to the book by respective ties which permit movement of selected pieces between mounting positions on respective first and second leaves.

9. A child's activity book according to claim 8 wherein the releasable mounting means mount all pieces of the set of pieces on a single leaf in initial locations exposed in an array visible through the front cover, from which selected individual pieces can be released and mounted at other mounting locations on another leaf during use.

10. A child's activity book according to claim 9 wherein the releasable mounting means comprise individual through-sockets extending through the cover and receiving all respective individual pieces of the set of pieces as respective press fits.

\* \* \* \* \*